(12) United States Patent
Zhang

(10) Patent No.: US 6,845,094 B1
(45) Date of Patent: Jan. 18, 2005

(54) NETWORK ADDRESS TRANSLATION BASED INTERNET PROTOCOL MOBILITY

(75) Inventor: Greg Zhang, San Jose, CA (US)

(73) Assignee: UT Starcom, Inc., Alameda, CA (US)

( * ) Notice: Subject to any disclaimer, the term of this patent is extended or adjusted under 35 U.S.C. 154(b) by 735 days.

(21) Appl. No.: 09/739,055

(22) Filed: Dec. 15, 2000

Related U.S. Application Data

(60) Provisional application No. 60/210,336, filed on Jun. 7, 2000, and provisional application No. 60/171,247, filed on Dec. 16, 1999.

(51) Int. Cl.$^7$ .................................. H04J 3/24
(52) U.S. Cl. ........................ 370/349; 370/389
(58) Field of Search .................. 370/331, 349, 370/352, 354, 389, 401

(56) References Cited

U.S. PATENT DOCUMENTS

| | | | |
|---|---|---|---|
| 5,159,592 A | * 10/1992 | Perkins | 370/401 |
| 5,442,633 A | * 8/1995 | Perkins et al. | 370/331 |
| 6,061,346 A | * 5/2000 | Nordman | 370/352 |
| 6,487,406 B1 | * 11/2002 | Chang et al. | 370/401 |
| 6,507,908 B1 | * 1/2003 | Caronni | 370/389 |
| 6,510,153 B1 | * 1/2003 | Inoue et al. | 370/354 |

OTHER PUBLICATIONS

"Optimized Smooth Handoffs in Mobile IP", Perkins et al, (4/99__IEEE 0–7695–0250–4/99.*

* cited by examiner

Primary Examiner—Salvatore Cangialosi
(74) Attorney, Agent, or Firm—Clause A. S. Hamrick; Justin Boyce; Felix L. Fischer

(57) ABSTRACT

In an end to end fully internet protocol (IP) enabled network, a dynamic IP address space is used to address mobile hosts in order to facilitate mobility management. The network includes a wireless mobile network having a plurality of base stations each being associated with a portion of the dynamic IP address space. The base stations are operative to allocate dynamic IP addresses from the associated portion of the dynamic IP address space for each authenticated mobile host. Each of the base stations provides translation between the dynamic IP address space and a permanent IP address space so that the dynamic IP address space is transparent from the point of view of the mobile hosts. A gateway provides communicative coupling between the backbone of the wireless mobile network and a wire lined IP network. The gateway also provides translation between the dynamic IP address space and the permanent IP address space.

21 Claims, 6 Drawing Sheets

| TRANSLATED IP ADDRESS | ADDRESS TYPE | DYNAMIC IP ADDRESS |
|---|---|---|
| IP_A | | IP_A_SUBNET_1 |
| IP_B | | IP_C_SUBNET_2 |
| IP_C | | IP_C_SUBNET_3 |
| | | |
| | | |
| IP_D | | IP_D_SUBNET_4 |

FIG. 4

NETWORK ADDRESS TRANSLATION BASED INTERNET PROTOCOL MOBILITY

CROSS REFERENCE TO RELATED APPLICATIONS

Reference is made and priority claimed to U.S. provisional patent application No. 60/171,247, filed on Dec. 16, 1999, and U.S. provisional patent application No. 60/210,336, filed on Jun. 7, 2000.

FIELD OF THE INVENTION

The present invention relates generally to mobile communications networks, and more specifically to an addressing and mobility management scheme for use in a mobile communications network.

DESCRIPTION OF THE PRIOR ART

With the rapid advances in both TCP/IP and wireless technologies, new advances in mobile network technology are being developed. One of the most attractive models currently being considered in mobile networking is a fully end to end IP enabled mobile network which would provide the ability to communicate from end to end using IP as the transport protocol in a highly mobile network. However, the operational requirements for implementing a fully end to end IP enabled mobile network are very different from the operational requirements for implementing conventional TCP/IP networks. The mechanisms for handling mobility and providing packet transfer for mobile hosts must be very robust, must be integrated with wireless technology, and must be able to be scaled to a global network. As further explained below, there are several problems associated with the development of a fully end to end IP enabled mobile network. Because of these problem, other types of protocols have been developed for highly mobile networks.

Figure 1:
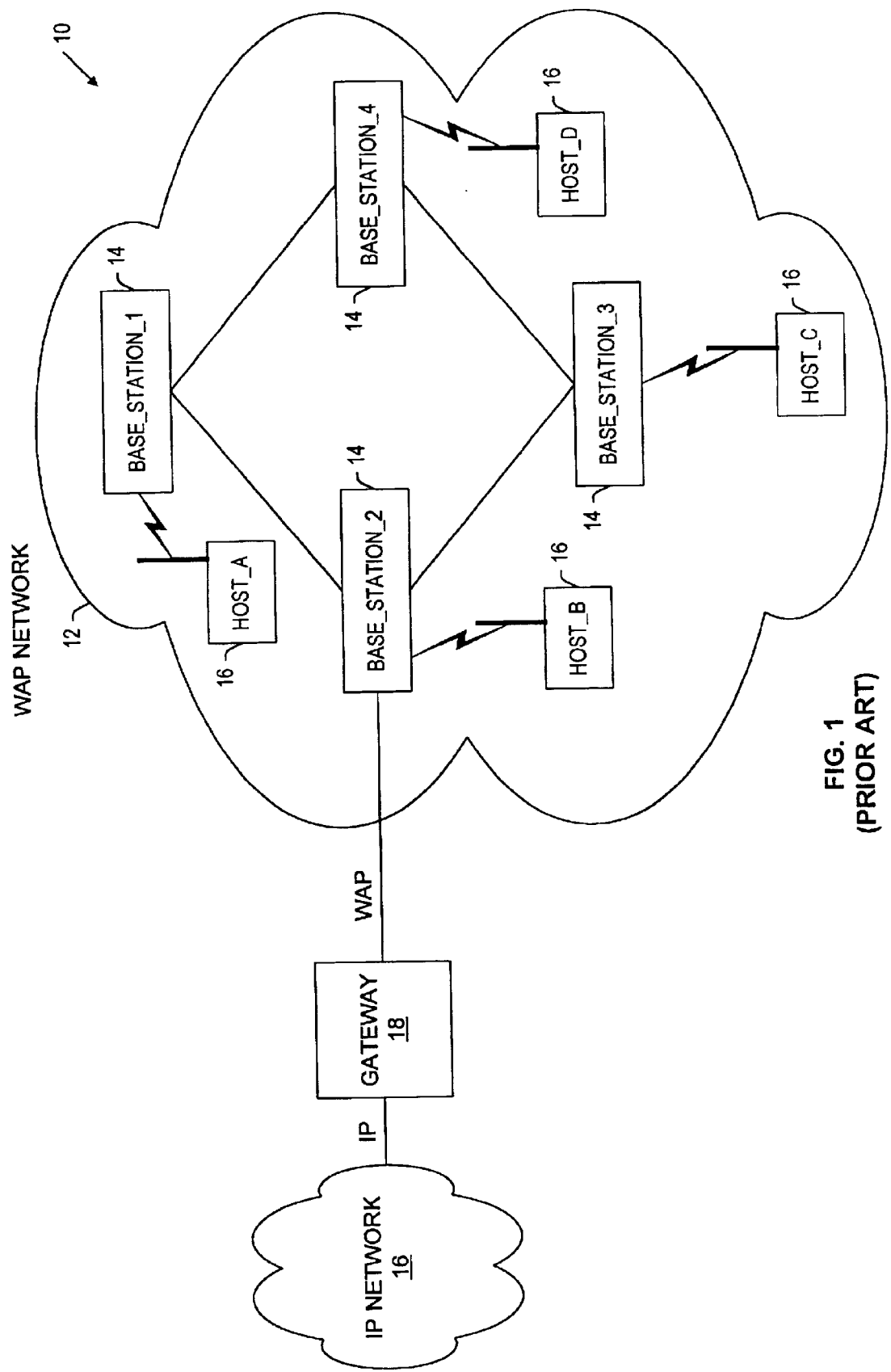

FIG. 1 shows a generalized block diagram illustrating a prior art network system at 10 including: a wireless application protocol (WAP) network 12 operating in accordance with standard WAP services, and being communicatively coupled with an internet protocol (IP) network 16 (e.g., the Internet) via a gateway 18 that provides a communication interface for translating between IP standard formatted information and WAP standard formatted information, thereby enabling communication between nodes of the IP network 16 and nodes of the WAP network 12 as further explained below. The WAP network 12 includes a plurality of base stations 14 designated BASE_STATION_1, BASE_STATION_2, BASE_STATION_3, and BASE_STATION_4, each having an associated coverage area, and providing wireless mobile telecommunication services to a plurality of subscribers using wireless host devices 16 located within the associated coverage area. The host devices 16 typically include telephone handsets, personal digital assistants (PDA's), and lap top computers.

WAP is a secure specification that supports most wireless networks including CDPD, CDMA, GSM, and TDMA. WAP is supported by many operating systems including operating systems specifically engineered for handheld devices include Palm OS, EPOC, Windows CE, FLEXOS, OS/9, and Java OS. WAPs that use displays and access the Internet run microbrowsers which are browsers with small file sizes that can accommodate the low memory constraints of handheld devices and the low-bandwidth constraints of a wireless-handheld network. WAP is an initiative that was started by Unwired Planet, Motorola, Nokia, and Ericsson.

An important problem associated with the network system 10 is that the gateway 18 must provide translation between the IP network services and WAP network services. Therefore, the gateway 18 requires a substantial amount of computing power and is thus very expensive. What is needed is a method and apparatus for providing IP network services to mobile hosts without the necessity of providing translation between fixed and wireless network information.

A fully end to end enabled IP mobile network would eliminate the necessity of providing translation between IP services and WAP services. However, as mentioned above, the IP standard is not designed to provide optimal services in a mobile network where hosts move from one location in the network to another. Rather the IP standard is designed to provide optimal services in a network where hosts are located in stationary locations. In a mobile network, the locations of mobile hosts must be tracked and managed. Currently, the mobile internet protocol (Mobile IP) standard, provided by the Mobile IP Working Group of the Internet Engineering Task Force (IETF), is being used to provide end to end IP transport services in mobile networks. However, there are several problems associated with Mobile IP as further explained below.

Figure 2:
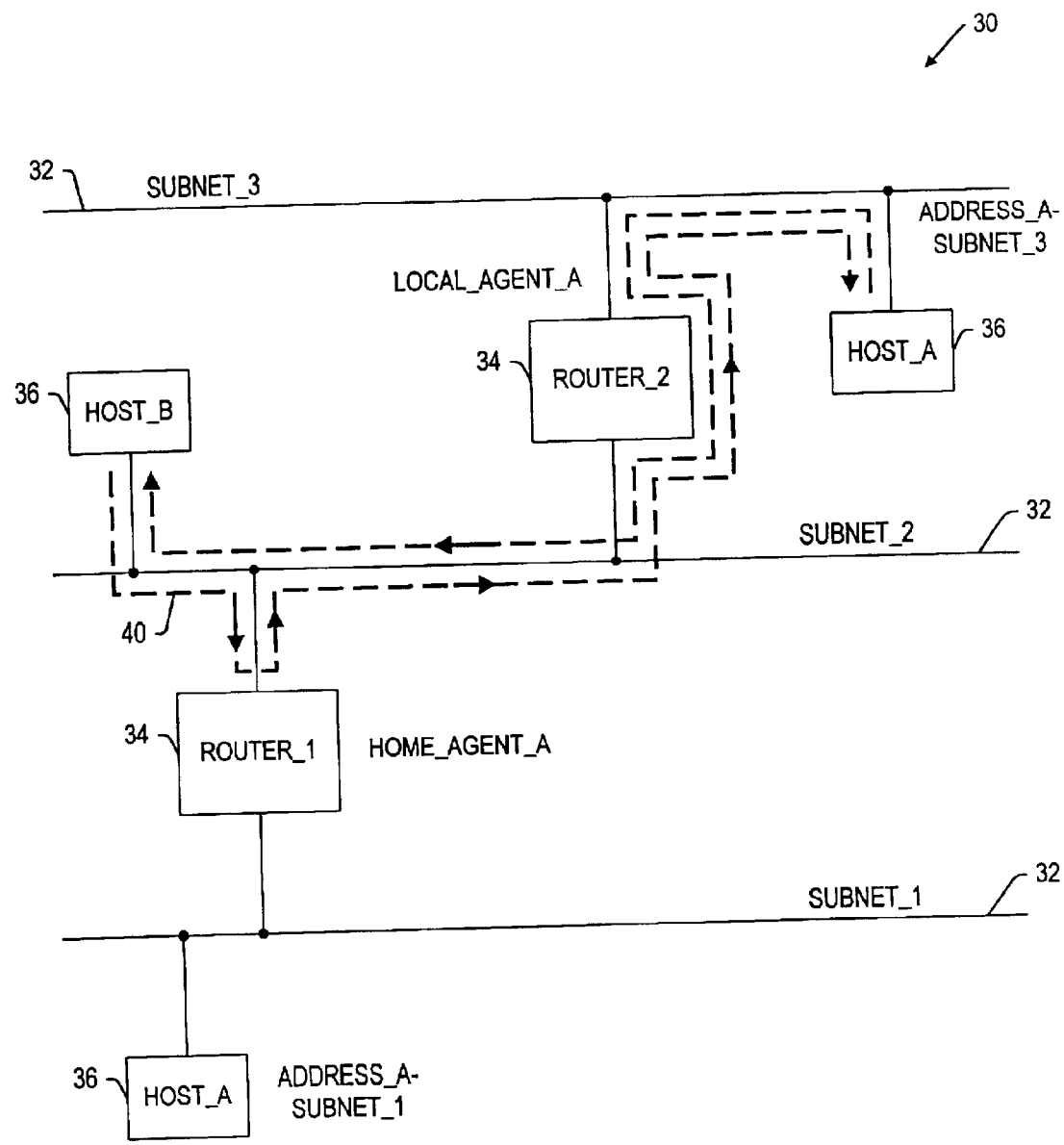

FIG. 2 shows a generalized block diagram of a wire lined network at 30 including: a plurality of subnets 32 designated SUBNET_1, SUBNET_2, and SUBNET_3; a plurality of routers 34 having a first router designated ROUTER_1 that provides communicative coupling between SUBNET_1 and SUBNET_2, and a second router designated ROUTER_2 providing communicative coupling between SUBNET_2 and SUBNET_3; and a plurality of hosts 36 designated HOST_A and HOST_B.

In the network 30, a dynamic host configuration protocol (DHCP) is used to assign an IP address to each particular host in accordance with a configuration process. At an initial time, HOST_A is connected to SUBNET_1, and a user of HOST_A activates HOST_A which subsequently transmits configuration request messages via the network 30. A DHCP server (not shown) responds to the configuration request messages, and assigns a local IP address in SUBNET_1 to HOST_A.

After a local IP address is assigned to HOST_A in accordance with DHCP, Mobile IP procedures are performed to instantiate a home agent designated HOME_AGENT_A at ROUTER_1, the home agent being a software entity executed at ROUTER_1.

Now, assume that HOST_A is moved from SUBNET_1 to SUBNET_3 of the network 30. In this case, a temporary address designated ADDRESS_A_SUBNET_3 will be assigned to HOST_A in accordance with the DHCP configuration process mentioned above. Also, a local agent designated LOCAL_AGENT_A is instantiated at ROUTER_2 for HOST_A while HOST_A is connected to SUBNET_3.

While HOST_A is connected to SUBNET_3, communication between HOST_A and other nodes of the network 30 becomes more complicated in accordance with Mobile IP. HOST_A may transmit data packets directly to HOST_B via the LOCAL_AGENT_A and ROUTER_2. However, for HOST_B to transmit data and control messages to HOST_A, an undesirable relay operation is required. In the conventional Mobile IP network, HOST_B must use the home address designated ADDRESS_A_SUBNET_1 to communicate with HOST_A. Therefore, information sent by HOST_B to HOST_A is first routed to ADDRESS_A_SUBNET_1, and HOME_AGENT_A at ROUTER_1 must relay the information to the temporary address ADDRESS_A_SUBNET_3 via the LOCAL_AGENT_A at ROUTER_2. This relaying operation presents a problem commonly referred to as the triangulation problem which has several drawbacks associated with it. Firstly, an extra transmission path between HOST_B and ROUTER_1 at 40 must be traversed by packets transmitted to the temporary address. Secondly, the HOME_AGENT_A must perform an encapsulation procedure to re-route the data packets transmitted from HOST_B to the temporary address, that is ADDRESS_A_SUBNET_3. Additionally, the dependency on the home agent is undesirable because if the link at 40 between SUBNET_2 and ROUTER_1 should fail, then communication between HOST_B and HOST_A fails. This communication failure seems particularly unnecessary because the path between HOST_B and HOST_A via SUBNET_2 and ROUTER_2 may be functional. However, Mobile IP does not provide for HOST_B to access the temporary address of HOST_A without communicating with the home agent of HOST_A.

Now suppose that the network 30 is a fully enabled wireless Mobile IP network wherein mobile hosts (e.g., HOST_A and HOST_B) communicate via end to end IP wireless voice and data services. In this case, mobility management would be extremely problematic due to the triangulation problem because in a wireless mobile communications network, the hosts are constantly roaming from one subnet (e.g., a coverage area of a base station) to another. The dependency on the home agent and the triangulation problem practically precludes the possibility of implementing a fully IP enabled end to end wireless mobile network without an addressing mobility management scheme that solves the problem of dependency on the home agent and the triangulation problem.

Another problem associated with mobile IP is that a mobile host may not continue a session, such as downloading e-mail or receiving data via a file transfer, upon moving from one subnet (e.g., a coverage area of a base station) to another. When a host moves to a new subnet, the host needs to be reconfigured to a new temporary address using the dynamic host configuration protocol as mentioned above. Therefore, if a hosts moves from one subnet (e.g., a coverage area of a base station) to another while the host is connected to another node, the connection is interrupted due to the need to perform a dynamic host configuration process establish a temporary address. Therefore, the service is disrupted when the host moves from one subnet (e.g., a coverage area of a base station) to another, and the connection must be reestablished and the disrupted operation typically must be repeated in its entirety.

What is needed is a method and apparatus for handling mobility and providing packet transfer for mobile hosts in a fully IP enabled end to end wireless mobile network, wherein the mechanisms for handling mobility and providing packet transfer are robust, integrated with wireless technology, and scalable to a global network.

What is needed is a method and apparatus providing an addressing scheme and a mobility management scheme that solves the problem of dependency on a home agent and the triangulation problem in a fully IP enabled end to end wireless mobile network.

SUMMARY OF THE INVENTION

It is an object of the present invention to provide an addressing scheme and a mobility management scheme for use in a fully IP enabled end to end wireless mobile network.

Briefly, a presently preferred embodiment of the present invention includes a fully end to end enabled internet protocol (IP) network wherein each of a plurality of mobile hosts has an associated permanent IP address, and wherein a dynamic IP address space is used to address the mobile hosts in order to facilitate mobility management.

The fully IP enabled network includes a wireless mobile network having a plurality of base stations communicatively coupled with each other via a back bone of the mobile network. Each of the base stations has an associated coverage area, and is associated with a portion of the dynamic IP address space. Each of the base stations is capable of wireless communication with associated local mobile hosts located within the associated coverage area, and is operative to allocate dynamic IP addresses from the associated portion of the dynamic IP address space for authenticated ones of the associated local mobile hosts.

Each of the base stations receives dynamically addressed IP packets via the back bone, each of the dynamically addressed IP packets including a destination IP address field carrying a dynamic IP address of an associated destination one of the associated local mobile hosts. Each of the base stations is further operative to translate the dynamic IP addresses of the associated destination mobile hosts to the permanent IP addresses of the associated destination mobile hosts.

Each of the base stations also receives permanent IP addressed packets from mobile hosts via wireless links, each of the permanent IP addressed packets including a destination IP address field carrying a destination permanent IP address of an associated destination one of the mobile hosts. Each of the base stations is further operative to translate the destination permanent IP addresses of the destination mobile hosts to current dynamic IP addresses of the associated destination mobile hosts.

A gateway provides communicative coupling between the backbone of the wireless mobile network and a wire lined IP network. The gateway receives permanent IP addressed via the wire lined IP network, each of the permanent IP addressed packets including a destination IP address field carrying a permanent IP address of an associated destination one of the mobile hosts. The gateway is operative to translate the permanent IP addresses of the associated destination mobile hosts to current dynamic IP addresses of the associated destination mobile hosts.

An important advantage of the NAT based IP mobility method of the present invention is that it solves the problem of dependency on a home agent and the triangulation problem in a fully IP enabled end to end wireless mobile network.

The foregoing and other objects, features, and advantages of the present invention will be apparent from the following detailed description of the preferred embodiment which makes reference to the several figures of the drawing.

IN THE DRAWING

Figure 3A:
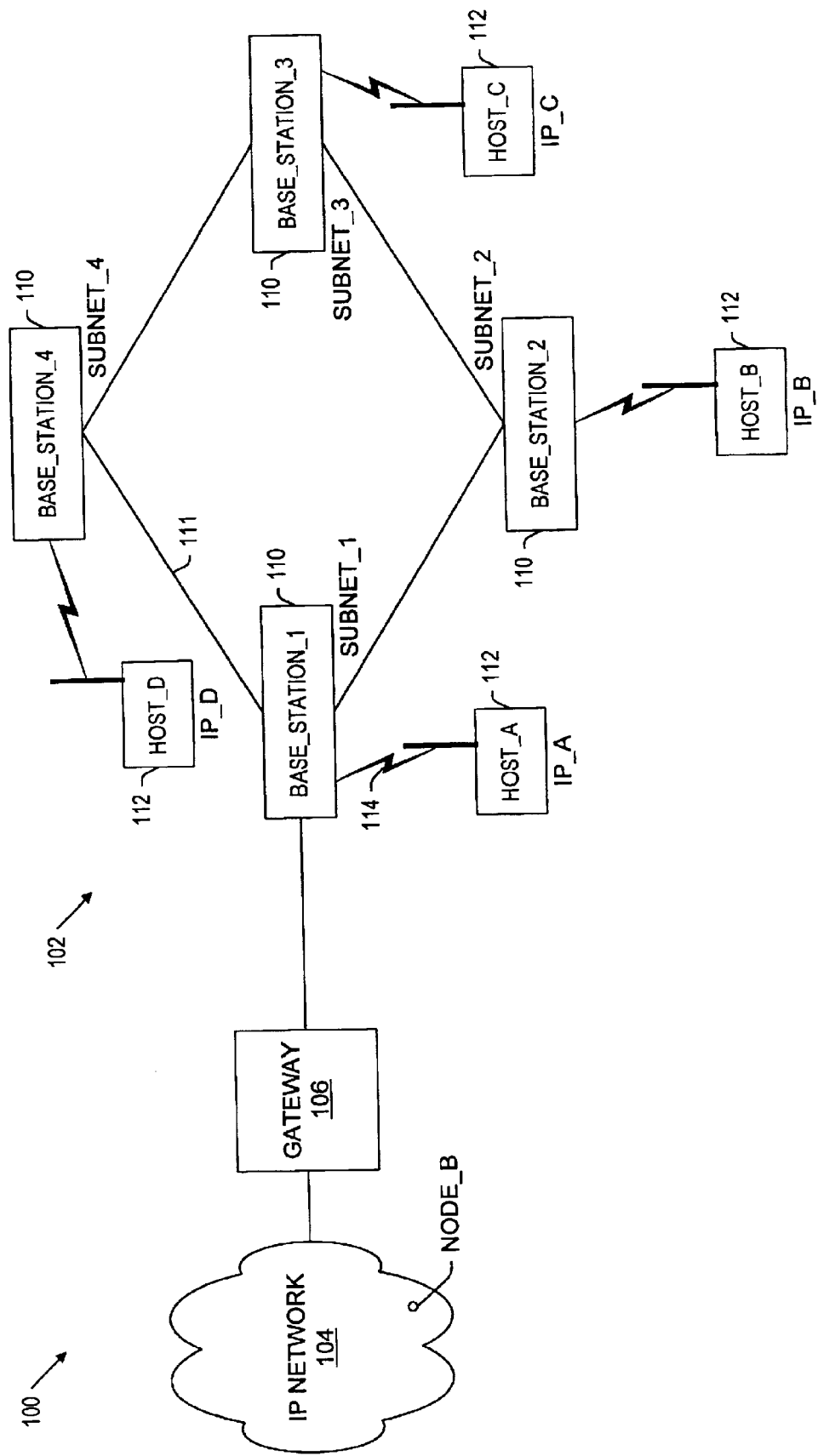
Figure 3B:
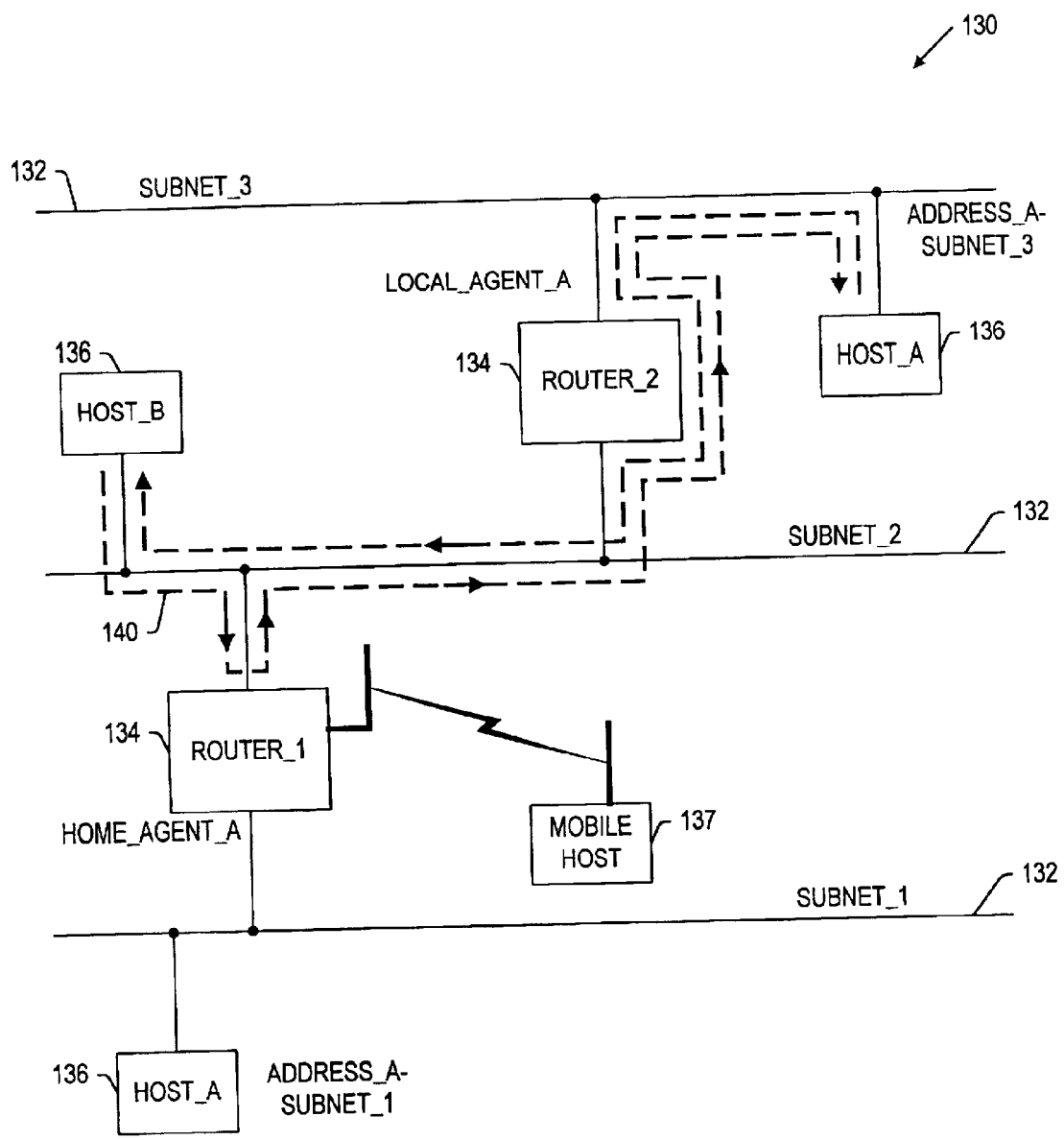
Figure 3C:
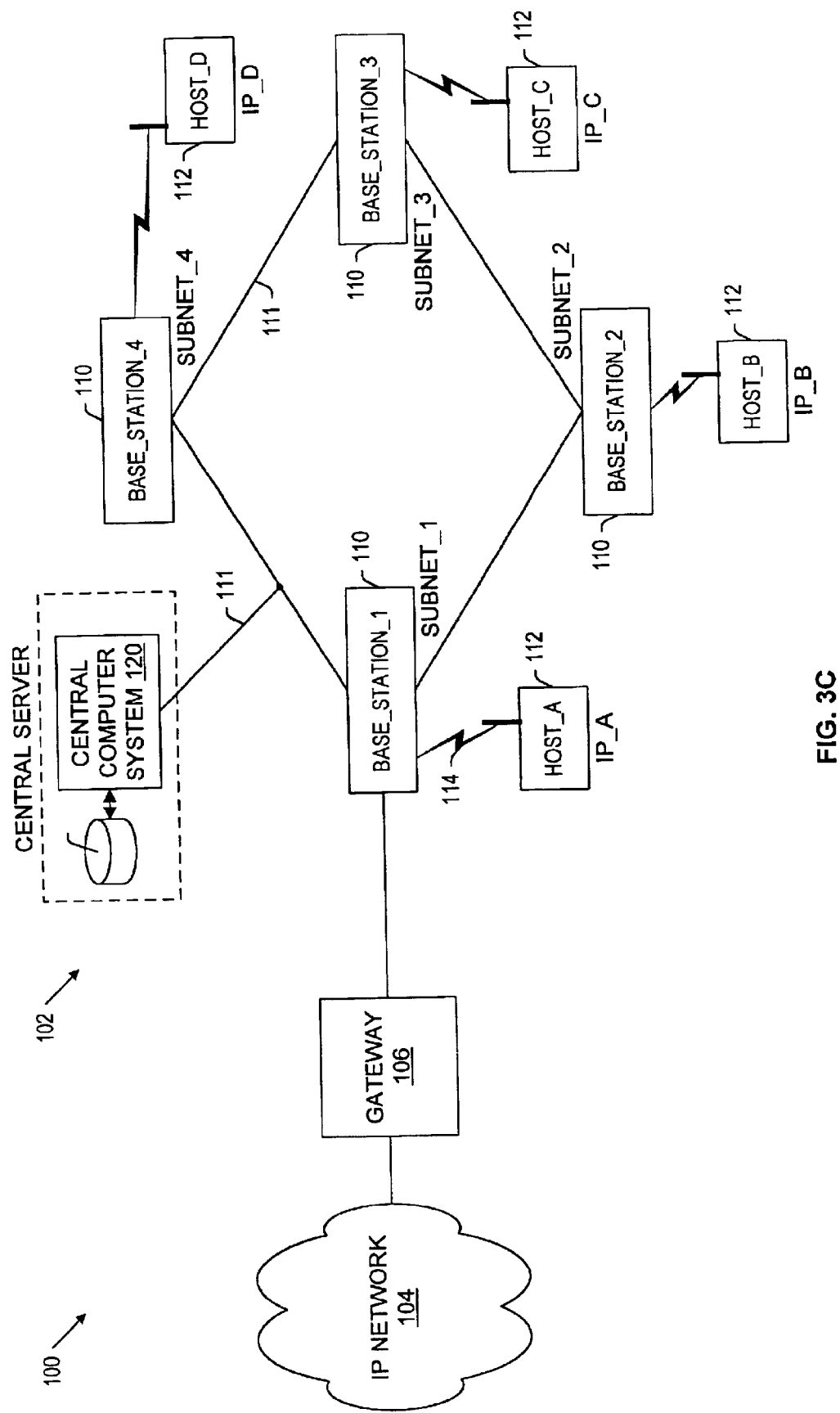

FIG. 1 is a generalized block diagram of a conventional wireless application protocol (WAP) network communicatively coupled with an IP network via a gateway;

FIG. 2 is a generalized block diagram of a conventional Mobile IP network; and FIGS. 3A through 3C are generalized block diagrams of embodiments of a network address translation (NAT) based fully IP enabled end to end wireless mobile network system in accordance with the present invention; and FIG. 4 is a table diagram illustrating network address translation information managed in a distributed cache of the network system of FIG. 3A.

DETAILED DESCRIPTION OF THE PREFERRED EMBODIMENTS

FIG. 3A shows a generalized block diagram of an end to end fully enabled internet protocol (IP) network system at 100 in accordance with the present invention. The network system 100 includes: a fully end to end IP enabled wireless mobile network 102; and a wire lined IP network 104 (e.g., the Internet) communicatively coupled with the wireless mobile network 102 via a gateway 106.

The wireless IP mobile network 102 includes: a plurality of base stations 110 designated BASE_STATION_1, BASE_STATION_2, BASE_STATION_3, and BASE_STATION_4, each having an associated coverage area having at least one cell, each of the base stations 110 being communicatively coupled with each other and with the gateway 106 via a back bone 111 of the wireless mobile network 102; and a plurality of mobile hosts 112 designated HOST_A, HOST_B, HOST_C, and HOST_D, each being operative to communicate with corresponding ones of the base stations 110 via wireless links 114 in accordance with the internet protocol (IP). Each of the hosts 112 may be a wireless telephone handset, a personal digital assistant (PDA), or a lap top computer. In accordance with one embodiment of the present invention, each of the mobile hosts 112 is fully IP enabled and is therefore operative to send and receive IP packets using the standard IP network addressing scheme.

In accordance with an authentication procedure, when one of the hosts 112 is initially activated while located in the coverage area of a particular one of the base stations 110, the host 112 sends a link layer identifier to the particular base station via a wireless communication link 114. Each of the base stations 110 is operative to determine if a host is an "authorized" host based on the received link layer identifier. In one embodiment, the link layer identifier is a manufacturers identification value which is "burned in" to the host.

The network system 100 provides an end to end fully internet protocol (IP) enabled network wherein a dynamic IP address space is used along with a permanent UP address space to address each authorized one of the mobile hosts 112 in order to facilitate mobility management. Each authorized one of the hosts 112 has an associated permanent IP address. For example, HOST_A has a permanent IP address designated IP_A, HOST_B has a permanent IP address designated IP_B, HOST_C has a permanent IP address designated IP_C, and HOST_D has a permanent IP address designated IP_D. Also, each authorized one of the mobile hosts 112 is assigned an associated dynamic IP address as further explained below.

Each of the base stations 110 is associated with a portion of a dynamic address space referred to herein as a wireless subnet. For example, BASE_STATION_1 is associated with a portion of the dynamic address space designated SUBNET_1, BASE_STATION_2 is associated with a portion of the dynamic address space designated SUBNET_2, etc. Each of the base stations 110 is capable of allocating a dynamic IP address from its associated portion of the dynamic address space for each host located within its associated coverage area. Each of the base stations 110 allocates a dynamic IP address from its associated portion of the dynamic address space for each one of the mobile hosts 112 which is either authenticated by the base station 110, or determined to have moved into the coverage area associated with the base station in accordance with a handoff procedure. Upon a successful completion of the registration and authentication procedure, the base station allocates a dynamic IP address from its portion of the dynamic IP address space for the mobile host.

The base stations 110 and gateway 106 provide network address translation between the dynamic IP address space and the permanent IP address space by using stored network address translation (NAT) information. The NAT information comprises a cache of mobility information generally including a plurality of cache entries, each having a permanent IP address field for storing a permanent IP address associated with one of the mobile hosts 112 in the wireless mobile network 102 (FIG. 3A), and a dynamic IP address field for storing a dynamic IP address associated with the permanent IP address.

In a preferred embodiment of the present invention, the NAT information may be stored in a distributed cache implemented by each of the base stations 110 and the gateway 106, as further explained below. In this embodiment, after a successful authentication procedure and allocation of a dynamic IP address for a mobile host, each of the base stations starts to advertise NAT information, indicating the mapping of the mobile host's permanent IP address and its new dynamic IP address, to the remaining base stations 110 in the wireless mobile network 102 and to the gateway 106. In one embodiment of the present invention, the NAT information is advertised, or propagated, throughout the wireless mobile network 102 in accordance with a distributed cache synchronization protocol (DCS protocol) described in applicants pending United States patent application entitled "Distributed Cache Synchronization Protocol". In another embodiment of the present invention, the NAT information may be centrally stored in a centralized cache implemented by a data base of a central server site.

FIG. 3B shows a generalized block diagram illustrating a heterogeneous network at 130 including at least one fixed host and at least one mobile host operating in a same network. In one embodiment, the network system 100 (FIG. 3A) includes the heterogeneous network 130 connected to the backbone 111 (FIG. 3A). The heterogeneous network 130 includes: a plurality of subnets 132 designated SUBNET_1, SUBNET_2, and SUBNET_3; a plurality of routers 134 having a first router designated ROUTER_1 that provides communicative coupling between SUBNET_1 and SUBNET_2, and a second router designated ROUTER_2 providing communicative coupling between SUBNET_2 and SUBNET_3; a plurality of stationary hosts 136 designated HOST_A and HOST_B; and at least one mobile host 137 operate to communicate with ROUTER_1 via a wireless link. On any one of the subnets, there can be both mobile hosts and stationary hosts.

The NAT based IP mobility protocol may be used in the environment of the heterogeneous network 130 where there is a mix of mobile hosts and stationary wire lined hosts throughout the network. For each of the stationary hosts 136, a corresponding permanent IP address is allocated from the address space of the subnet, while no dynamic IP address is allocated. No address mapping needs to be advertised for the stationary hosts.

FIG. 3C shows a generalized block diagram of an alternative end to end fully enabled internet protocol (IP) network system at 118 in accordance with the present invention, the network system 118 being similar to the network system 110 except that the network system 118 includes a central server site 120 having a central computer system 122 communicatively coupled with the base stations 110 and the gateway 106 via the back bone 111 of the wireless mobile network 102, and a centralized data base 124 for storing NAT information. The centralized data base 124 comprises a cache of NAT mobility information generally including a plurality of cache entries, each having a permanent IP address field for storing a permanent IP address associated with one of the mobile hosts 112 in the wireless mobile network 102 (FIG. 3c), and a dynamic IP address field for storing a dynamic IP address associated with the permanent IP address. In this embodiment, after a successful authentication procedure and allocation of a dynamic IP address for a mobile host, each of the base stations transmits a message including the NAT information indicating the mapping of the mobile host's permanent IP address and its new dynamic IP address, to the centralized data base 124.

The embodiment of the present invention wherein the NAT information is stored and managed in a distributed cache is preferable to the embodiment in which the NAT information is centrally stored in a centralized cache. If the NAT information is centrally stored in a centralized cache, then there is an undesirable dependency on the central computer system 122. The distributed cache approach is more scaleable and robust and therefore better suited for use in a potentially global network.

Each of the base stations 110 is operative to receive local mobile host bound dynamically addressed packets from nodes of the IP network 104 and from other ones of the mobile hosts 112 via the back bone 111. Each of the local mobile-host-bound dynamically addressed packets includes a destination IP address field carrying a dynamic IP address of an associated destination one of the associated local mobile hosts located within the associated coverage area. Each of the base stations is operative to translate the dynamic IP addresses (of the associated destination mobile hosts) carried by the local mobile host bound dynamically addressed packets to the permanent IP addresses of the associated destination mobile hosts.

Consider that a target local mobile host moves from the coverage area of a first base station to the coverage area of a second base station. After the target local mobile host has moved on to the second base stations coverage area, a problem may occur if a packet is addressed to the target host using the dynamic IP address allocated for it when it was in the first base stations coverage area. A solution for this case is provided as follows. When a handoff occurs, the first and second base stations exchange messages. A new mapping of the permanent IP address of the target host to a new dynamic IP address at the second base station will be passed from the second base station to the first base station. The first base station will not reuse the old dynamic IP address for a period of time during which the mapping of the old dynamic IP address and the new dynamic IP address for the target host is kept in the mapping table at the first base station. When a packet destined for the target host carrying the old dynamic IP address arrives at the first base station, the first base station translates the old dynamic IP address to the new dynamic IP address, and forwards the packet to the second base station. The period of time during which this mapping of the old dynamic IP address to the new dynamic IP address is kept at the first base station is determined by how fast a new mapping between a permanent IP address and a dynamic IP address can be propagated throughout the network. It can be a configured value for the base stations.

Each of the base stations 110 is also operative to receive mobile host originating permanent IP addressed packets from mobile hosts 112 via the wireless links 114. Each of the mobile host originating permanent IP addressed packets includes a destination IP address field carrying a destination permanent IP address of an associated destination one of the mobile hosts 112. Each of the base stations 110 is further operative to translate the destination permanent IP addresses (of the destination mobile hosts) carried by the mobile host originating permanent IP addressed packets to current dynamic IP addresses of the associated destination mobile hosts.

The gateway 106 provides for communicatively coupling the backbone 111 of the wireless mobile network 102 with the wire lined IP network 104. The gateway 106 receives mobile-host-bound permanent IP addressed packets via the wire lined IP network 104, each of the mobile-host-bound permanent IP addressed packets including a destination IP address field carrying a permanent IP address of an associated destination one of the mobile hosts 112. The gateway 106 is operative to translate the permanent IP addresses (of the associated destination mobile hosts) carried by the mobile host bound permanent IP addressed packets to current dynamic IP addresses of the associated destination mobile hosts. The gateway 106 provides for advertising the permanent IP addresses of each of the mobile hosts 112 to nodes of the IP network 104 as prefixes served by the gateway 106.

In accordance with the present invention, the dynamic IP addresses are transparent to the mobile hosts 112 and to all nodes of the IP network 104. In one embodiment, the dynamic IP addresses and the permanent IP addresses have the same number of bits. Address resolution for mobile hosts is achieved using the existing standard domain name system (DNS system). In the DNS system, only the permanent IP addresses are registered. When a lookup of a mobile host is received from any node in the network, its permanent IP address is returned. The fact that the host is mobile and it may have a dynamic IP address created at its point of attachment is transparent from all end systems in the network.

FIG. 4 shows a generalized table diagram illustrating base station NAT information 150 stored at each one of the base stations 110. The base station NAT information 150 generally includes a plurality of entries 152, each having: a translated IP address field 154 for storing a permanent IP address associated with one of the mobile hosts 112 located in the coverage area of the base station; an address type field 155 for indicating whether the translated IP address is a permanent IP address or a dynamic IP address for cases where the mobile host has since moved on to a new base station; and a dynamic IP address field 156 for storing a dynamic IP address associated with the permanent IP addresses.

In the described embodiment, the NAT information 150 is maintained at each one of the base stations 110 (FIG. 3A) for each associated one of the mobile hosts 112 (FIG. 3A) that has been activated within the coverage area associated with the base station. Each of the base stations stores the permanent IP address and dynamic IP address associated with each host that is currently, or has recently been, authenticated within the coverage area associated with the base station. The same NAT information 150 is also stored at the gateway 106 for mapping the permanent IP address of the mobile hosts to the associated dynamic IP addresses.

As a first example of operation of the network system 100 (FIG. 3A), consider that a node designated NODE_B of the IP network 104 needs to send an IP packet to HOST_C of the wireless mobile network 102. We assume that HOST_C has previously been authenticated by BASE_STATION_3, and that BASE_STATION_3 has allocated a dynamic IP address designated IP_C_BASE_STATION_3 for HOST_C, and further that BASE_STATION_has advertised the association of the permanent IP address IP_C of HOST_C and the dynamic IP address IP_C_BASE_STATION_3 of HOST_C to the gateway 106 and to other base stations 110 in the wireless mobile network 102. We also assume that the gateway 106 has previously transmitted advertising packets, in accordance with the IP routing protocol, to nodes of the IP network 104 including NODE_B, the advertising packets including the permanent IP address IP_C of HOST_C as a prefix served by the gateway 106. NODE_B may then transmit an IP packet bound for HOST_C wherein the source IP address field of the packet carries the permanent IP address of NODE_B, and the destination IP address field of the packet carries the permanent IP address IP_C of HOST_C. The gateway 106 receives this and translates the contents of the destination IP address field of the packet from the permanent IP address IP_C of HOST_C to the dynamic IP address IP_C_BASE_STATION_3 of HOST_C. The packet is then propagated via the back bone 111 to BASE_STATION_3 which translates the contents of the destination IP address field of the packet from the dynamic IP address IP_C_BASE_STATION_3 of HOST_C back to the permanent IP address IP_C of HOST_C. BASE_STATION_3 then transmits the packet to HOST_C via a wireless link, and HOST_C receives the packet with its permanent IP address indicated in the IP source address field of the packet, and therefore the dynamic IP address IP_C_BASE_STATION_3 is transparent to HOST_C.

As a second example of operation of the network system 100 (FIG. 3A), consider that HOST_C of the wireless mobile network 102 needs to send an IP packet to HOST_B. We assume that HOST_B has previously been authenticated by BASE_STATION_2, and that BASE_STATION_2 has allocated a dynamic IP address designated IP_B_BASE_STATION_2 for HOST_B, and further that BASE_STATION_2 has advertised the association of the permanent IP address IP_B of HOST_B and the dynamic IP address IP_B_BASE_STATION_2 of HOST_B to the other base stations 110 in the wireless mobile network 102 including BASE_STATION_3 at which HOST_C currently resides. HOST_C may then transmit an IP packet bound for HOST_B wherein the source IP address field of the packet carries the permanent IP address IP_C of HOST_C, and the destination IP address field of the packet carries the permanent IP address IP_B of HOST_B. BASE_STATION_3 receives this packet and translates the contents of the destination IP address field of the packet from the permanent IP address IP_B of HOST_B to the dynamic IP address IP_B_BASE_STATION_2 of HOST_B. The packet is then propagated via the back bone 111 to BASE_STATION_2 which translates the contents of the destination IP address field of the packet from the dynamic IP address IP_B_BASE_STATION_2 of HOST_B back to the permanent IP address IP_B of HOST_B. BASE_STATION_2 then transmits the packet to HOST_B via a wireless link.

Each of the base stations 110 is operative to transmit its mapping information to other nodes, including base stations, of the mobile network 102 and the gateway 106. The gateway 106 is responsive to the mapping information, and operative to store the mapping information for purposes of performing network address translation as further explained below.

Each of the base stations 110 is further operative to advertise routing services in accordance with an IP routing protocol by broadcasting advertising packets indicating that specified portions, or subnets, of the dynamic address space may be served by the base station with a particular hop count. For example, BASE_STATION_1 is operative to broadcast advertising packets indicating that SUBNET_1 may be reached via BASE_STATION_1 with a hop count of zero, SUBNET_2 may be reached via BASE_STATION_1 with a hop count of one, and SUBNET_3 may be reached via BASE_STATION_1 with a hop count of two.

In one embodiment of the present invention, the dynamic IP address space for dynamic IP addresses is a separate reserved address space that has no overlap with the address space of the permanent IP address. In an alternative embodiment of the present invention, the dynamic IP address space is an overlapping space that either partially or completely overlays the permanent IP address space.

In the embodiment wherein the dynamic IP address space is separate from the permanent IP address space, the gateway 106 (FIG. 3C) is operative to translate the permanent IP addresses of the mobile hosts to and from their associated dynamic IP addresses. The IP address for a node in the IP network 104 is kept intact as it propagates through the mobile network 111.

In the embodiment wherein the dynamic IP address space is an overlapping space that either partially or completely overlays the permanent IP address space, the gateway 106 (FIG. 3A) is operative to allocate IP addresses for nodes in the IP network 104 that are in communication with a host in the network 102. The gateway 106 (FIG. 3A) must create this type of mapping on an as-needed basis. There is a hold period when a dynamic IP address is reallocated to a new IP address for a host on the network 104. The gateway 106 advertises the creation and removal of the mapping throughout network 102 so that the base station on network 102 can provide address translation for packets going to the hosts on network 104.

Consider that NODE_B (FIG. 3A) initiates communication with HOST_B by sending a packet. When the packet arrives at the gateway 106, the gateway 106 is operative to allocate a new dynamic IP address IP_NODE_B_GATEWAY for node B, and to send a message including the mapping to target BASE_STATION_2 so that BASE_STATION_2 knows how to map the IP addresses for node B when a response packet is received via the wireless link from HOST_B.

Consider that HOST_B initiates communication with NODE_B (FIG. 3A) by sending a packet. BASE_STATION_2 is operative to receive the packet, and to determine whether there is a dynamic IP address already allocated for NODE_B. If there is a dynamic IP address already allocated for NODE_B, the mapping is used. If there is not a dynamic IP address already allocated for NODE_B, BASE_STATION_2 is operative to send a request to gateway 106 for mapping. The gateway 106 creates a new mapping and replies to BASE_STATION_2 by providing the new mapping. BASE_STATION_2 then uses the mapping to forward the packet to NODE_B. Therefore regardless of whether there is a dynamic IP address already allocated for NODE_B, the gateway 106 controls mapping. Note that BASE_STATION_2 cannot create ,mapping because conflicts could arise with gateway 106. Note also that if a plurality of gateways 106 were provided, each node associated with each gateway would need to uses the services of the associated gateway.

An advantage associated with the present invention is that a mobile host may continue a session, such as downloading e-mail or receiving data via a file transfer, upon moving from one subnet (e.g., a coverage area of a base station) to another. When a host moves to a new subnet, the host need not be reconfigured to a new temporary address using the dynamic host configuration protocol as in the prior art as described above. Therefore, when a host moves from one subnet (e.g., a coverage area of a base station) to another while the host is connected to another node, the connection is not interrupted. There is no disruption of service because handoff procedures and cache management update procedures may be executed very quickly.

Another advantage associated with the present invention is that no excessive computing power is required for rerouting packet from a home address to a temporary address as in the prior art.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A fully end to end IP enabled wireless mobile network wherein each of a plurality of mobile hosts has an associated permanent IP address, and wherein a dynamic IP address space is used to address the mobile hosts in order to facilitate mobility management, comprising:

a plurality of base stations communicatively coupled with each other via a back bone, each of said base stations having an associated coverage area, and being associated with a portion of the dynamic IP address space, and also being capable of wireless communication with associated local mobile hosts located within said associated coverage area, and being operative to allocate dynamic IP addresses from said associated portion of said dynamic IP address space for corresponding ones of said associated local mobile hosts, and each of said base stations is further operative to receive first packets via said back bone, each of said first packets carrying a dynamic IP address of an associated destination one of said associated local mobile hosts, each of said base stations being operative to translate said dynamic IP addresses carried by said first packets to the permanent IP addresses of said associated destination mobile hosts.

2. A fully end to end IP enabled wireless mobile network as recited in claim 1 wherein each of said base stations is further operative to receive second packets from said associated local mobile hosts via wireless links, each of said second packets carrying a destination permanent IP address of an associated destination one of the mobile hosts, each of said base stations being further operative to translate said destination permanent IP addresses carried by said second packets to current dynamic IP addresses of said associated destination mobile hosts.

3. A fully end to end IP enabled wireless mobile network as recited in claim 2 further comprising a gateway for communicatively coupling said backbone of said wireless mobile network with a wire lined IP network, said gateway for receiving third packets via the wire lined IP network, each of said third packets carrying a permanent IP address of an associated destination one of the mobile hosts, said gateway being operative to translate said permanent IP addresses carried by said third packets to current dynamic IP addresses of said associated destination mobile hosts.

4. A fully end to end IP enabled wireless mobile network as recited in claim 2 wherein each of said base stations is operative to translate between permanent IP addresses and dynamic IP addresses by accessing a distributed cache storing mapping information.

5. A fully end to end IP enabled wireless mobile network as recited in claim 2 wherein each of said base stations is further operative to store associated mapping information including said permanent IP addresses and said dynamic IP addresses associated with each said local mobile host located within said associated coverage area.

6. A fully end to end IP enabled wireless mobile network as recited in claim 3 wherein said gateway is operative to store mapping information including said permanent IP addresses and said dynamic IP addresses associated with each of said mobile hosts located within said wireless mobile network.

7. A fully end to end IP enabled wireless mobile network as recited in claim 5 wherein each of said base stations is further operative to transmit said associated mapping information to each other one of said base stations and to said gateway via said backbone in accordance with a distributed cache protocol.

8. A fully end to end IP enabled wireless mobile network as recited in claim 7 wherein said gateway is responsive to said mapping information transmitted by each of said base stations, and operative to store said mapping information.

9. A fully end to end IP enabled wireless mobile network as recited in claim 3 wherein said gateway is operative to advertise said permanent IP addresses of each of said mobile hosts to nodes of the wire lined IP network as prefixes served by said gateway.

10. A fully end to end IP enabled wireless mobile network comprising a plurality of base stations coupled together via a backbone, each of said base stations having an associated coverage area and being operative to communicate with a plurality of mobile hosts located within said associated coverage area, each of said mobile hosts having an associated permanent IP address, each of said base stations also being operative to allocate a dynamic IP address for each of said mobile hosts located within said associated coverage area;

wherein the dynamic IP addresses are allocated from a dynamic IP address space, and wherein each of said base stations is associated with a portion of said dynamic IP address space, each of said base stations being operative to allocate said dynamic IP addresses from said associated portion of said dynamic IP address space; and, wherein each of said base stations is further operative to receive first packets via said back bone, each of said first packets carrying a dynamic IP address of an associated destination one of said associated local mobile hosts, each of said base stations being operative to translate said dynamic IP addresses carried by said first packets to the permanent IP addresses of said associated destination mobile hosts.

11. A fully end to end IP enabled wireless mobile network as recited in claim 10 wherein each of said base stations is further operative to receive second packets from said associated local mobile hosts via wireless links, each of said second packets carrying a destination permanent IP address of an associated destination one of the mobile hosts, each of said base stations being further operative to translate said destination permanent IP addresses carried by said second packets to current dynamic IP addresses of said associated destination mobile hosts.

12. A fully end to end IP enabled wireless mobile network as recited in claim 11 further comprising a gateway for communicatively coupling said backbone of said wireless mobile network with a wire lined IP network, said gateway for receiving third packets via the wire lined IP network, each of said third packets carrying a permanent IP address of an associated destination one of the mobile hosts, said gateway being operative to translate said permanent IP addresses carried by said third packets to current dynamic IP addresses of said associated destination mobile hosts.

13. A fully end to end IP enabled network wherein each of a plurality of mobile hosts has an associated permanent IP address, and wherein a dynamic IP address space is used to address the mobile hosts in order to facilitate mobility management, comprising:

- a wireless mobile network including a plurality of base stations communicatively coupled with each other via a back bone of said mobile network, each of said base stations having an associated coverage area, and being associated with a portion of the dynamic IP address space, and also being capable of wireless communication with associated local mobile hosts located within said associated coverage area, and being operative to allocate dynamic IP addresses from said associated portion of said dynamic IP address space for selected ones of said associated local mobile hosts, each of said base stations being further operative to receive first packets via said back bone, each of said first packets including a destination IP address field carrying a dynamic IP address of an associated destination one of said associated local mobile hosts, each of said base stations being operative to translate said dynamic IP addresses of said associated destination mobile hosts to the permanent IP addresses of said associated destination mobile hosts, each of said base stations being further operative to receive second packets from mobile hosts via wireless links, each of said second packets including a destination IP address field carrying a destination permanent IP address of an associated destination one of the mobile hosts, each of said base stations being further operative to translate said destination permanent IP addresses of said destination mobile hosts to current dynamic IP addresses of said associated destination mobile hosts; and
- a gateway for communicatively coupling said backbone of said wireless mobile network with a wire lined IP network, said gateway for receiving third packets via the wire lined IP network, each of said third packets including a destination IP address field carrying a permanent IP address of an associated destination one of the mobile hosts, said gateway being operative to translate said permanent IP addresses of said associated destination mobile hosts to current dynamic IP addresses of said associated destination mobile hosts.

14. A fully end to end IP enabled network as recited in claim 13 wherein said selected associated local mobile hosts are determined by an authentication procedure.

15. A fully end to end IP enabled network as recited in claim 14 wherein each of said base stations is further operative to store associated mapping information including said permanent IP addresses and said dynamic IP addresses associated with each of said mobile hosts located within said associated coverage area.

16. A fully end to end IP enabled network as recited in claim 15 wherein each of said base stations is further operative to transmit said associated mapping information to each other one of said base stations and to said gateway via said backbone in accordance with a distributed cache protocol.

17. A fully end to end IP enabled network as recited in claim 16 wherein said gateway is responsive to said mapping information transmitted by each of said base stations, and wherein said gateway is operative to store said mapping information.

18. A fully end to end IP enabled network as recited in claim 13 wherein:

- a target one of said local mobile hosts is initially located in a first coverage area associated with a first one of said base stations;
- said first base station stores first mapping information indicating a mapping between a permanent IP address of said target host and a first dynamic IP address of said target host;
- said target host moves from said first coverage area to a second coverage area associated with said second base station;
- said first and second base stations are operative to exchange messages upon a handoff that occurs when said target host moves from said first coverage area to said second coverage area;
- said second base station is operative to create and store second mapping information indicating a mapping between said permanent IP address of said target host and a second dynamic IP address of said target host; said second base station is operative to pass said second mapping information to said first base station;
- said first base station is operative to reserve said first dynamic IP address for a period of time;
- said first base station is responsive to a packet destined for said target host and carrying said first dynamic IP address, and operative to translate said first dynamic IP address to said second dynamic IP address, and to forward said packet to said second base station.

19. A fully end to end IP enabled network as recited in claim 13 wherein said network is a heterogeneous network further including at least one stationary wire lined host.

20. A fully end to end IP enabled network as recited in claim 13 wherein said dynamic IP address space overlaps at least a portion of an address space comprising the permanent IP addresses.

21. A fully end to end IP enabled network as recited in claim 13 wherein said dynamic IP address space is a separate reserved address space having no overlap with an address space comprising the permanent IP addresses.

* * * * *